May 1, 1945. C. H. TERRY 2,375,148
COLLAPSIBLE CORE FOR PLASTIC MOLDING
Filed June 16, 1944 2 Sheets-Sheet 1
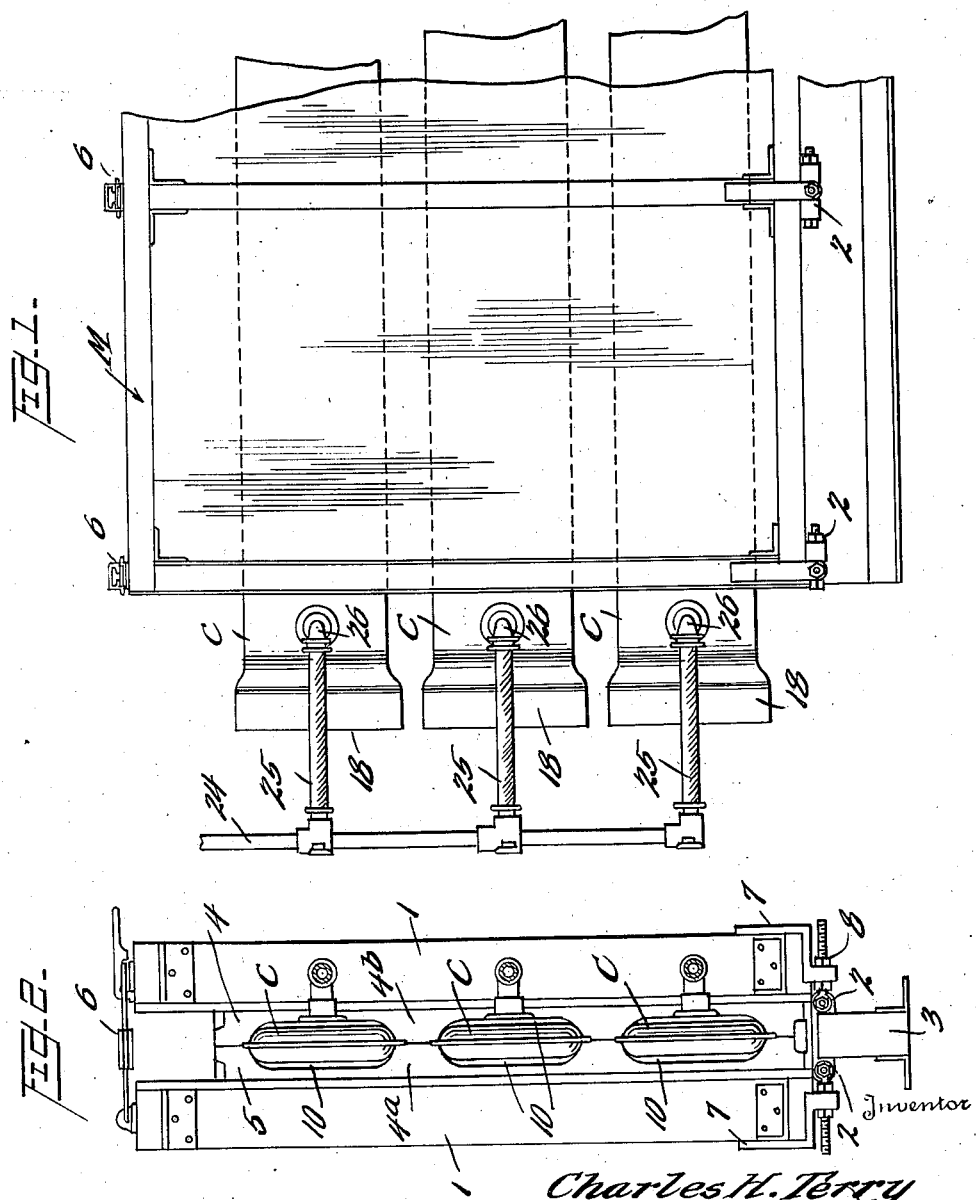

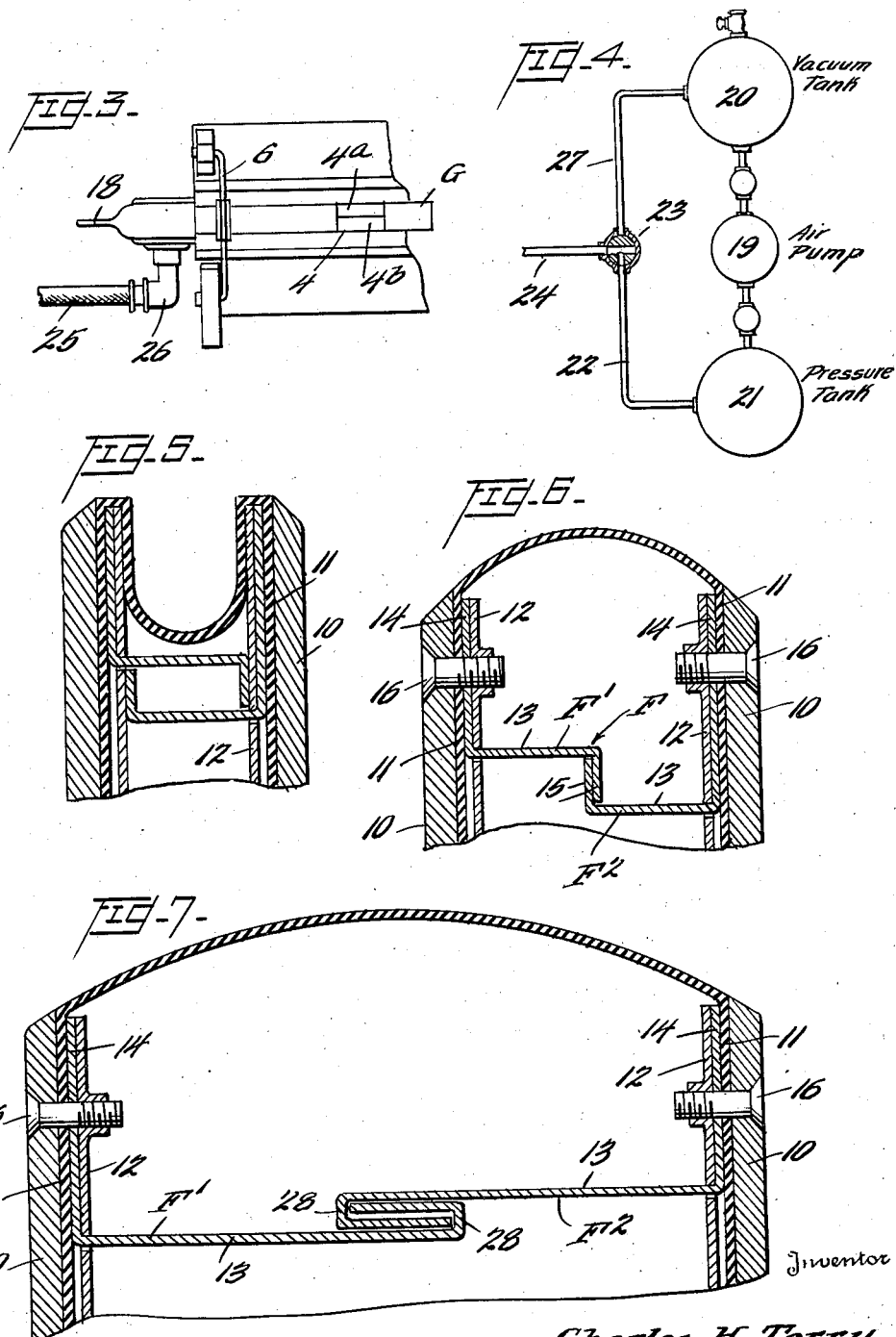

Patented May 1, 1945

2,375,148

UNITED STATES PATENT OFFICE 2,375,148

COLLAPSIBLE CORE FOR PLASTIC MOLDING

Charles H. Terry, West Palm Beach, Fla.

Application June 16, 1944, Serial No. 540,680

6 Claims. (Cl. 25—128)

This invention relates to the molding of hollow building elements such as slabs, panels, blocks and the like, and has for its object to provide an improved core adapted to be positioned intermediate the confining walls of a mold and, around which the plastic material is poured.

An important object of the invention is to provide a collapsible core of improved construction adapted to be expanded and collapsed by positive and negative, or relative pneumatic pressures.

Another object of the invention is to provide a collapsible core of the above character having stiffly flexible and independently movable side walls which strip cleanly away from the hardened plastic material composing the building element when the core is collapsed, and means for limiting the inward and outward travel of the side walls.

A further object of the invention is to provide in a collapsible core of the above character means for controlling the admission and withdrawal of air so as to facilitate the separation of the core from the cast building element and thus increase the speed of production of building elements.

Still another object of the invention is to provide for the application of a positive collapsing force on the entire outside surface of the core by creating a partial vacuum within the interior of the core.

Other objects and advantages will be apparent from the following detailed description of a preferred embodiment of the invention, reference being made to the annexed drawings, in which:

Figure 1 is a view in side elevation of a portion of a mold having a plurality of pneumatically expansible and collapsible cores associated therewith;

Figure 2 is an end view of the mold of Figure 1;

Figure 3 is a top plan view of the mold of Figure 1;

Figure 4 is a schematic showing of the pneumatic system for supplying air to and withdrawing it from the cores;

Figure 5 is a transverse cross-sectional view through part of a core, showing the core in collapsed condition;

Figure 6 is a view of the core corresponding to Figure 5, but showing the core in expanded condition; and Figure 7 is a transverse cross-sectional view through part of a core of modified construction, showing the core in fully expanded condition.

In Figs. 1 through 3 is shown a mold M for casting hollow wall panels or partitions which comprises a pair of mold sections 1 both supported at their lower edges upon hinges 2 secured to a longitudinally extending base beam 3. Each end of the mold is closed by a gate 4 vertically disposed between the opposed faces of the mold sections 1, the gate having elongated openings 5 therein to receive an end of a plurality of elongated cores C and support the cores in horizontal position. The gates are each divided medially lengthwise into two parts 4a and 4b to permit the molding of either ribbed panels or hollow tubular panels, as desired. The mold sections have flat inner faces normally extending in upright parallel relation, being held together at their tops by releasable clamps 6 during the pouring of a charge of plastic material into the mold. Upon release of the clamps the sections may be swung apart about their hinged connection with the base beam 3 preparatory to the removal of the cast panels therefrom. The mold sections 1 rest upon stirrups 7 adjustable inwardly or outwardly along screw-threaded shafts 8, each shaft forming an arm of the hinge 2, and these stirrups are held in adjusted position by means of locking nuts 9 threadedly mounted on the shafts. By this arrangement the spacing between the mold sections—and hence the thickness of the panels to be cast—may be varied, the width of the end gates 4 being suitably filled out to conform to the adjustment of the mold sections. This general type of mold is more particularly described in my Patent No. 1,631,839, granted June 7, 1927. For a purpose later to be explained, a supplementary gate G is provided, this gate corresponding in all general respects to the gate 4 but being movable along the base beam 3 so as to follow the cast panel when it is shifted out of the mold.

The mold shown in the drawings is adapted to accommodate three collapsible cores C, although it will be apparent that it might be so constructed as to accommodate more or less than this number of cores. As best illustrated by the transverse cross-sectional views of Figs. 5 and 6 which show only a portion of a core, the core comprises a pair of flat vertical side walls 10 made, for example, of plywood or other stiffly flexible material. The inner surface of each side wall is overlain by a flexible rubberized fabric sheet 11 forming a part of an inflatable envelope, the continuation of the sheets constituting the unreinforced upper and lower edges of the core, the upper edge being shown in Figs. 5 and 6.

Located within the flexible envelope is a travel limiting frame composed of two complementary sections $F^1$ and $F^2$, in all general respects alike, and attached to opposite side walls of the core.

Each frame section of a pair of frame sections comprises a sheet metal stamping defining a horizontally-disposed plate 13 extending the full length of the core and formed on one edge with an upright flange 14 overlying the flexible sheet 11 and formed on its other edge with a vertically-disposed lip 15. The pairs of frame sections F¹ and F² are duplicated at the upper and lower edges of the core and extending vertically between corresponding frame sections at spaced-apart intervals on each side of the core are gusset plates 12, these gusset plates overlying the flanges 14 and being rigidly attached thereto by welding or in any other suitable manner. Screws 16 pass through aligned openings in the side wall 10, the flexible sheet 11 and the flange 14, the opening in the flange 14 being punched so as to provide an annulus of metal surrounding the opening adapted to make threaded engagement with the inner end of the screw to clamp the parts together and retain them in assembly. The two sections of a pair of complementary frame sections are located with their plates 13 disposed in parallel offset relation so that the lip 15 of one section is movable into flat abutting engagement with the lip of the other section to limit the outward expansion of the core. In assembling the core, the frame F is inserted through the open end of the flexible envelope, which end is then flattened and vulcanized, as indicated at 18, to seal the envelope against air leakage.

For inflating the several cores there is provided a pneumatic pressure system, as schematically shown in Figure 4. An air pump 19 delivers air from vacuum tank 20 to pressure tank 21, and from the pressure tank the air flows through line 22 and through a three-way valve 23 into main line 24. As best shown in Figure 1, main line 24 is connected through hose branches 25 with the ends of the cores C, which cores project through and beyond the openings in the gates 4 closing the vertical ends of the mold. Connection of the branches 25 with the cores is made through couplings 26 passing through the side walls of the cores so as to provide communication between the inside of the envelope and the air supply line. When the valve 23 is turned through 180 degrees, line 22 is cut off from the main line 24 and this main line is placed in circuit with the line 27 leading to the vacuum tank 20. This allows air to be exhausted from the cores and delivered into the vacuum tank when the cores are to be collapsed.

The manner in which the apparatus is employed in casting wall panels is as follows: With the side sections 1 of the mold M closed and held in parallel relation by means of the clamps 6 and the collapsed cores C extending lengthwise and supported in the openings in the gates 4 closing opposite ends of the mold, the valve 23 is turned so as to allow pressure to flow from the pressure tank 21 through the lines 22, 24 and 25 into the cores so as to expand the cores to the position shown in Figure 6 with the lips 15 in abutting engagement and the sides of the cores spaced from the adjacent sections 1 of the mold, after which the valve is turned to shut off and hold the pressure in the cores.

The plastic material of which the panels are to be formed—such as gypsum or a cementitious composition—is poured into the open upper edge of the mold where it settles into the space between the cores and the side sections of the mold. Following an interval in which the plastic material is allowed to harden, the valve 23 is turned to permit the escape of pressure from the cores, via the lines 25, 24 and 27, to the vacuum tank 20, creating a negative pressure in the cores which causes them to strip cleanly away from the cast panels and to be retracted to the position of Figure 5, wherein the lips 15 abut the sides of the cores and prevent the total collapse of the cores.

The clamps 6 are then released and the side sections 1 of the mold are swung downward into open position; the parts 4a and 4b of the gate 4 at one end of the mold (the opposite end to that shown in Figure 1) are stripped from around the projecting ends of the cores, and the cast panel is removed lengthwise from the mold and endwise from off the cores. During removal of the cast panel the supplemetary gate G travels with the panel so as to provide support for the ends of the cores during and following the removal of the panel from the mold. The mold may be placed in condition for casting another panel by replacing the removed end gate 4, returning supplementary gate G to its extreme forward position abutting the forward gate 4, and then swinging the side sections 1 of the mold to upright position and readmitting pressure to the cores to effect their expansion.

Because of the stiffly flexible nature of the plywood forming the side walls of the cores, and their independent movement when air is exhausted from the cores to less than atmospheric pressure, the walls are exteriorly acted upon by atmospheric pressure beginning at their ends projecting beyond the ends of the mold and this pressure, traveling along the lengths of cores, will progressively strip the side walls away from the cast panel from end to end of the cores, and in the same manner the upper and lower edges of the cores will be sucked inwardly to the position shown in Figure 5. The frame sections 13 besides limiting the expansion of the cores, also fulfill an important function to limit the retraction of the cores so as to provide space between the sides of the core for receiving the fabric folds when the envelop is deflated and to prevent clamping the folds between the sides such as would occur if the sides were allowed to fully collapse.

In Figure 7 is shown a core corresponding in all essential respects to the core of Figs. 5 and 6 but differing therefrom in the special form of the stops carried by the frame sections F¹ and F² of the travel-limiting frames. In this embodiment of the invention—in which the parts similar to those of Figs. 5 and 6 are designated by the same reference numerals—the pair of horizontally-disposed sheet metal plates 13 are formed at their ends with reversely bent portions defining hooks 28. The arrangement is such that when the cores are fully inflated the hooks slide into interlocking engagement with each other, as shown in Figure 7, to limit the spread of the core.

The cores constructed in accordance with the foregoing description are relatively light in weight, are largely protected against puncture and abrasive action on their sides most susceptible to injury and are capable of being quickly expanded and collapsed. The mold in which the cores are contained may be any suitable shape, such for example as rectangular, polygonal, round or oval. Manifestly various other changes in structure and design of the apparatus described above may be made without departing from the spirit of the invention as defined by the following claims.

I claim:

1. A collapsible core adapted to be disposed within a mold, said core comprising a pair of opposed, independently-movable, relatively rigid side walls extending lengthwise thereof, sheets of flexible rubber extending between opposite side walls and forming therewith a fluid-receiving compartment, means for admitting fluid into and out of said compartment to expand the side walls and the rubber sheets into engagement with plastic material within the mold, and means for limiting the expansion and contraction of the side walls.

2. A collapsible core adapted to be disposed within a mold, said core comprising a flexible envelope having side walls composed of stiffly-flexible plywood extending lengthwise thereof, means for admitting fluid under pressure into the envelope for expanding the core and frame sections secured to opposite side walls within the core so constructed and arranged to limit the inward and outward travel of the side walls.

3. A collapsible core adapted to be disposed within a mold, said core comprising a flexible envelope having independently movable side walls composed of stiffly-flexible material extending lengthwise thereof, means for admitting fluid under pressure into the envelope for expanding the core and frame sections secured to opposite side walls said frames having interengaging lips adapted to limit the outward and inward travel of the side walls.

4. A collapsible core adapted to be disposed within a mold, and comprising a flexible envelope having independently movable side walls and means for limiting the inward and outward travel of the side walls, of a pneumatic system comprising a pressure tank and a vacuum tank, a pump for removing air from the vacuum tank and delivering air under pressure to the pressure tank, air lines leading from the pressure and suction tanks to the core and means for placing either the pressure tank or the suction tank into communication with the core.

5. A collapsible core adapted to be disposed within a mold, and comprising a flexible envelope having independently movable side walls, and a pneumatic system for expanding and collapsing the core, said pneumatic system comprising an air pressure tank and a vacuum tank, a pump for removing air from the vacuum tank and delivering air under pressure to the pressure tank, air lines leading from the pressure and suction tanks to the core and a valve for placing either the pressure tank or the suction tank into communication with the core.

6. A collapsible core adapted to be disposed within a mold, said core comprising a pair of opposed, independently movable, relatively rigid side walls extending lengthwise thereof, sheets of flexible rubber extending between opposite side walls and forming therewith a fluid-receiving compartment, means for admitting fluid under pressure into said compartment to expand the side walls and the rubber sheets into engagement with plastic material within the mold, means for creating suction below atmospheric pressure within the compartment for contracting the side walls to collapse the core, and means for limiting the expansion and contraction of the side walls.

CHARLES H. TERRY.